United States Patent Office 3,634,586
Patented Jan. 11, 1972

3,634,586
STABLE AQUEOUS SUSPENSIONS OF AMPICILLIN
Walter Edwin Kaser and Murray Arthur Kaplan, Syracuse, and Alphonse Peter Granatek, Baldwinsville, N.Y., assignors to Bristol-Myers Company, New York, N.Y.
No Drawing. Filed Dec. 4, 1968, Ser. No. 781,270
Int. Cl. A61k 21/00
U.S. Cl. 424—80
7 Claims

ABSTRACT OF THE DISCLOSURE

An antibacterial composition for intramuscular administration after reconstitution with water which comprises a mixture of a source of sodium ions and finely-divided amphoteric ampicillin coated with both a surfactant and a viscosity regulator. In a preferred embodiment for a single dose the mixture comprises sodium chloride, trisodium citrate and 200 mesh amphoteric ampicillin coated with small amounts of lecithin and polyvinylpyrrolidone; the addition of sterile water q.s. 1 ml. provides a suspension which is stable at room temperature for at least three months and is highly suited for intramuscular injection.

BACKGROUND OF THE INVENTION (1) Field of the invention

This invention provides a particular powdered formulation of an antibacterial agent, amphoteric ampicillin, which is used by intramuscular injection after the addition of sterile water to form an aqueous suspension.

(2) Description of the prior art

Amphoteric α-aminobenzylpenicillin, also called amphoteric ampicillin, is described in U.S. Pat. 2,985,648 and has been found useful in the treatment of both Gram-positive and Gram-negative bacterial infections. The two forms of amphoteric ampicillin used in the present invention are the ampicillin trihydrate as described in U.S. Pat. 3,157,640 and the crystalline anhydrous ampicillin described in U.S. Patent 3,144,445.

Amphoteric ampicillin has not been marketed in a formulation suitable for administration by injection. Alkali metal salts, such as the sodium salt, of ampicillin are considerably more soluble in water than amphoteric ampicillin and thus form aqueous solutions which can be administered either intravenously or intramuscularly. The sodium salts of ampicillin have thus been preferred and marketed for use in compositions which are intramuscularly administered because they form true solutions rather than suspensions.

Although sodium ampicillin exhibits physical properties which in some respects make it preferable for use in intramuscular or intravenous compositions, it suffers from the serious drawback of being relatively unstable and quickly losing its potency after it is dissolved in water. As a result aqueous solutions of sodium ampicillin which have been reconstituted from the powder form must be administered within one hour after the reconstitution. This instability seriously limits the use of sodium ampicillin in aqueous compostions since required dosages must be made up individually just prior to expected use and this can result in either a great deal of lost time in preparation of a large number of dosages or excessive spoilage of the product.

SUMMARY OF THE INVENTION

It is an object of the present invention to provide compositions containing amphoteric ampicillin which can be administered intramuscularly. It is a further object of the present invention to provide compositions having improved stability when reconstituted with water. It is a further object of the present invention to provide compositions which upon intramuscular injection quickly release a large amount of ampicillin in the bloodstream of animals, including man, thus producing high and prolonged serum levels of ampicillin.

The objects of the present invention have been achieved by the provision, according to the present invention, of a composition in unit dosage form which after the addition of sterile water is then stable for at least three months when stored at room temperature and is suitable for intramuscular injection in mammals comprising 200-mesh or smaller particles of sterile amphoteric ampicillin of which each gram is coated with from 1 to 16 mgm. of lecithin and with from 2 to 40 mgm. of sterile polyvinylpyrrolidone and preferably the provision of a composition in unit dosage form which after the addition of sterile water is then stable for at least three months when stored at room temperature and is suitable for intramuscular injection in mammals comprising (a) 200-mesh or smaller particles of sterile amphoteric ampicillin coated with lecithin and with sterile polyvinylpyrrolidone and (b) Per gram of ampicillin from 6 to 50 mgm. of one or more nontoxic, pharmaceutically acceptable inorganic salts providing sodium ions.

A preferred embodiment of the present invention is a composition in unit dosage form which after the addition of sterile water is then stable for at least three months when stored at room temperature and is suitable for intramuscular injection in mammals comprising (a) 200-mesh or smaller particles of sterile amphoteric ampicillin of which each gram is coated with from 2 to 10 mgm. of lecithin and with from 10 to 20 mgm. of sterile polyvinylpyrrolidone and (b) From 1 to 8 mgm. of sterile, 200-mesh, U.S.P. sodium chloride per gram of ampicillin and (c) From 10 to 25 mgm. of sterile, anhydrous 200-mesh trisodium citrate per gram of ampicillin.

Another preferred embodiment of the present invention is a composition in unit dosage form which after the addition of sterile water is then stable for at least three months when stored at room temperature and is suitable for intramuscular injection in mammals comprising (a) About 62.5 to 600 mgm. of 200-mesh sterile amphoteric ampicillin of which each gram is coated with about 2 to 8 mgm. of lecithin and with about 10 to 20 mgm. of sterile polyvinylpyrrolidone and (b) From 1 to 8 mgm. of sterile, 200-mesh sterile, U.S.P. sodium chloride per gram of ampicillin and (c) From 12 to 24 mgm. of sterile, anhydrous 200-mesh trisodium citrate per gram of ampicillin.

It has been found that the composition of the present invention can be readily reconstituted to form elegant aqueous suspensions. The resultant suspensions are characterized by excellent fluidity, slow settling, easy resuspension and, when employed for intramuscular administration from presently available silicone coated vials, by excellent drainage therefrom. Furthermore, the composition of the present invention, after being reconstituted, exhibit excellent stability allowing a minimum use life of three months when stored at 25° C.

The compositions of the present invention are prepared by coating or mixing particulate amphoteric ampicillin having a size of 200 mesh or less and preferably having a size so that at least 99 weight percent is less than about 200 mesh, e.g. micropulverized with a solution of a surfactant, preferably lecithin, and a hydrophylic colloid viscosity regulator, preferably polyvinylpyrrolidone. The coating solvent employed is one which will promote homogeneous mixing with the ampicillin within the scope of the present invention, exemplary suitable solvents which can be employed include chloroform, methylene chloride or trichloroethylene. The procedure is set forth in detail in the examples below.

The compositions of this invention can be mixed with aqueous media to form suspensions which can be intramuscularly administered to animals including human beings. Thus, it is most convenient to store the compositions of this invention in vials having the internal surface coated with materials which facilitate removal of the composition therefrom, such as silicone polymers. The powdered composition and the aqueous medium are mixed and agitated to form an aqueous suspension of the powder. The suspension can be easily intramuscularly administered with a syringe.

It is to be understood that the process for making the compositions of this invention can be conducted under aceptic conditions to eliminate or greatly reduce the possibility of pathogens being associated with the compositions of this invention.

It is also to be understood that the compositions of the present invention can contain additional ingredients which promote the use thereof in intramuscular compositions. Thus, physiologically acceptable materials which suppress color formation such as dodecyl gallate or ascorbic acid can be employed. Preservatives can be employed; examples of useful preservatives are methyl paraben (methyl para-hydroxybenzoate) and propyl paraben (n-propyl para-hydroxybenzoate).

In use, the effectiveness of these compositions will depend upon various factors including age, weight, sex and physical condition. Normally, the dosage of ampicillin trihydrate will be that equivalent to about 62.5 to about 600 milligrams of ampicillin and doses are administered at a frequency of 1 to 4 times per day. After reconstitution the concentration of ampicillin is preferably in the range of 62.5 to 600 mgm./ml.

The following examples are intended to illustrate the present invention and are not intended to limit the same.

DESCRIPTION OF THE PREFERRED EMBODIMENTS

EXAMPLE 1

Ampicillin trihydrate, I.M. Product
(200 mesh or micropulverized)

(Label claim is 0.250 gm. ampicillin activity/ml. as the trihydrate)

FORMULA

| | Per one 1-dose vial (grams) |
|---|---|
| Ampicillin trihydrate, bulk sterile (200 mesh) | [1] |
| Lecithin, R.G. | [2]0.002 |
| Methyl paraben, U.S.P., sterile | 0.0009 |
| Propyl paraben, U.S.P., sterile | 0.0001 |
| PVP (polyvinylpyrrolidone), sterile | [3]0.005 |
| Sodium chloride, U.S.P., sterile (processed to 200 mesh) | 0.002 |
| Trisodium citrate, sterile, anhydrous, 200 mesh | [4]0.006 |

[1] 0.250 gram of activity. (Label claim is 250 mg./ml. ampicillin activity (as the trihydrate). This weight may be increased in amount by adding increments based on the following factors:
(1. Potency of ampicillin trihydrate
(2. Overbatch required for shelf life (stability)
(3. Overfill required for vial, syringe and needle holdup
(4. Machine fill variability).
[2] Lecithin may be varied, if desired, between 0.002 and 0.004 gram/dose.
[3] PVP may be varied, if desired, between 0.002 and 0.010 gram/dose.
[4] Anhydrous trisodium citrate may be varied, if desired, between 0.003 and 0.010 gram per dose.

Manufacturing instructions (1) The ampicillin trihydrate to be used must be sterile, pyrogen free and handled aseptically throughout the processing.

(2) The ampicilin trihydrate is pulverized through a sterile Fitzmill equipped with a 100-mesh screen, water on the jacket and mill running at 8500 r.p.m., at the rate of 25 kilos/hour and collected into a sterile container.

(3) The puverized ampicillin trihydrate, the 200-mesh sodium chloride and the anhydrous trisodium citrate are then loaded into a sterile Patterson-Kelly V blender equipped with an intensification bar adapted for liquid addition. The blender has been rendered sterile by spraying with peracetic acid and exposure to ethylene oxide gas for 16 hours prior to use. Care must be taken, before blender is loaded, so that no condensation of the gases has occurred inside the blender. The condensation may be prevented by obtaining proper atmospheric room temperature. The blender is run for thirty minutes with intensification action to assure initial blending of material.

(4) Using the "liquid addition apparatus" of the blender, add the required volume of sterile, pyrogen free PVP-lecithin-methyl and propyl paraben-methylene chloride solution in five equal portions. In preparing this solution use 0.2 ml. methylene chloride per ml. of final product after reconstitution. After each addition of solution the intesification bar is utilized for a maximum of two minutes using 4 "agitation" periods during the fifteen minute blending period required for each addition of solution. At the termination of each blending period the pressure developed during the blending process must be released (noted on gauge on shell of blender) and vacuum applied to remove the methylene chloride vapors. This must be repeated to assure complete removal of vapors. Do not use vacuum at above 28° C.

(5) When all the solution has been added and blend properly vacated of vapors the material is dropped from the blender and trayed for drying. The material is placed in covered trays and placed in a hot air atmospheric oven and dried for six hours. The temperature of heated air should not exceed 45° C. After six hours of heating, the heat is turned off and dry air is circulated over the trays for 10 hours to assure complete drying. *Caution:* Vacuum is not to be applied to ampicillin trihydrate at a temperature greater than 28° C.

(6) Repulverize the coated material utilizing the procedure of Step (p) so that the following requirement is met:

Retained on a 200-mesh screen 0.1% maximum (7) Blend the powder from Step (6) for two hours.

(8) Collect into sterile containers as a finished bulk product for final disposition.

(9) The proper amount of coated ampicillin trihydrate mixture is filled using aseptic technique, into officially designated size *silicone* coated vials.

(10) The water content of the final product should fall between 12.0 and 14.5%.

Use

The addition of sterile water q.s. 1 ml. produces an elegant aqueous suspension of ampicillin trihydrate which is stable at room temperature for at least three months.

EXAMPLE 2

Ampicillin trihydrate. I.M. product (200 mesh or micropulverized)

(Label claim is 0.400 gm. ampicillin activity/ml. as the trihydrate)

FORMULA

Per one 1-dose vial (grams)

Ampicillin trihydrate, bulk sterile (200 mesh) ___ (1)
Lecithin, R. G. _____ [2] 0.001
Methyl paraben, U.S.P., sterile _____ 0.0009
Propyl paraben, U.S.P., sterile _____ 0.0001
PVP (Polyvinylpyrrolidone), sterile _____ [3] 0.005
Sodium chloride, U.S.P., sterile (processed to 200 mesh) _____ [4] 0.001
Trisodium citrate, sterile, anhydrous, 200 mesh __ [5] 0.006

[1] 0.400 gram of activity. (Label claim is 400 mg./ml. ampicillin activity (as the trihydrate). This weight may be increased to a maximum of 8% by adding increments based on the following factors:
   (1. Potency of ampicillin trihydrate
   (2. Overbatch required for shelf life (stability)
   (3. Overfill required for vial, syringe and needle holdup
   (4. Machine fill variability
   (5. If an overfill of greater than 8% is required, then an increased fill and more water for reconstitution is required.)
[2] Lecithin may be varied, if desired, between 0.001 and 0.003 gram/dose.
[3] PVP may be varied, if desired, between 0.001 and 0.010 gram/dose.
[4] Sodium chloride may be varied, if desired between 0.0005 and 0.002 gram/dose.
[5] Anhydrous trisodium citrate may be varied, if desired, between 0.003 and 0.008 gram per dose.

Manufacturing instructions

As in Example 1.

Use

The addition of sterile water q.s. 1 ml. produces an elegant aqueous suspension of ampicillin trihydrate which is stable at room temperature for at least three months.

EXAMPLE 3

Ampicillin trihydrate. I.M. product (200 mesh or micropulverized)

(Label claim is 0.500 gm. ampicillin activity/ ml. as the trihydrate)

Per one 1-dose vial (grams)

Ampicillin trihydrate, bulk sterile (200 mesh) __ (1)
Lecithin, R.G. _____ [2] 0.001
Methyl paraben, U.S.P., sterile _____ 0.0009
Propyl paraben, U.S.P., sterile _____ 0.0001
PVP (polyvinylpyrrolidone), sterile _____ [3] 0.005
Sodium chloride, U.S.P., sterile (processed to 200 mesh) _____ [4] 0.0005
Trisodium citrate, sterile, anhydrous, 200 mesh _ [5] 0.006

[1] 0.500 gram of activity. (Label claim is 500 mg./ml. ampicillin activity (as the trihydrate). This may be increased to a maximum of 8% by adding increments based on the following factors:
   (1. Potency of ampicillin trihydrate
   (2. Overbatch required for shelf life (stability)
   (3. Overfill required for vial, syringe and needle holdup
   (4. Machine fill variability
   (5. If an overfill of greater than 8% is required, then an increased fill and more water for reconstitution is required.)
[2] Lecithin may be varied, if desired, between 0.0005 and 0.003 gram/dose.
[3] PVP may be varied, if desired, between 0.002 and 0.01 gram/dose.
[4] Sodium chloride may be varied, if desired between 0.0003 and 0.002 gram/dose.
[5] Anhydrous trisodium citrate may be varied, if desired, between 0.003 and 0.012 gram per dose.

Manufacturing instructions

As in Example 1.

Use

The addition of sterile water q.s. 1 ml. produces an elegant aqueous suspension of ampicillin trihydrate which is stable at room temperature for at least three months.

EXAMPLE 4

| Ingredient | Amount used, gm. | Per 1 dose, mg. |
|---|---|---|
| Polyvinylpyrrolidone | 1.5 | 5 |
| Lecithin | 0.6 | 2 |
| Methyl paraben | 0.27 | 0.9 |
| Propyl paraben | 0.03 | 0.1 |
| Sodium chloride | 0.6 | 2 |
| Sodium citrate, anhydrous | 1.8 | 6 |
| Ampicillin trihydrate | 90.0 | 300 |
| Total weight/dose | | 316 |
| Total weight/5 doses | | [1] 1.58 |

[1] Gm.

The polyvinylpyrrolidone, lecithin and parabens were dissolved in 50 ml. methylene chloride and coated onto the ampicillin trihydrate by trituration in a mortar. The coated powder was then air dried at 37° C. for 24 hours, screened 200 mesh, and blended with the 200 mesh sodium chloride and sodium citrate.

15 ml. silicone-coated glass vials were filled with 1.58 gm. of the blend and placed on test.

When reconstituted with 3.8 ml. DI (deionized) $H_2O$, the volume of the suspension was 5 ml. and the pH was 6.2.

The reconstituted suspension injected readily through a No. 22 1½" needle, did not pack after 48 hours standing, and was not foamy after shaking.

Determination by bioassay (after 100-fold dilution) of the stability of reconstituted samples after storage for the indicated periods of time at room temperature (25° C.) gave the following assay results in mcg./ml.

| Time in weeks | Assay in mcg./ml. | Time in weeks | Assay in mcg./ml. |
|---|---|---|---|
| Initial | [1] 2,670 | 6 | 2,485 |
| 1 | 2,390 | 8 | 2,435 |
| 2 | 2,735 | 12 | 2,535 |
| 4 | 2,450 | | |

[1] 2,700.

EXAMPLE 5

| Ingredient | Amount used, gram | Per 1 dose, milligram |
|---|---|---|
| Polyvinylpyrrolidone | 5.1 | 5 |
| Lecithin | 2.04 | 2 |
| Methyl paraben | 0.918 | 0.9 |
| Propyl paraben | 0.102 | 0.1 |
| Sodium chloride | 2.04 | 2 |
| Sodium citrate, anhydrous | 6.12 | 6 |
| Ampicillin trihydrate, 200 mesh | 306.0 | 300 |
| Total weight/1 dose | | 316 |
| Total weight/16 doses | | [1] 5.056 |

[1] Gm.

The polyvinylpyrrolidone, lecithin and parabens were dissolved in 150 ml. methylene chloride and coated onto the ampicillin trihydrate by trituration in a mortar.

The coated ampicillin trihydrate was dried at 37° C. for 24 hours, screened 200 mesh and blended with the sodium chloride and sodium citrate.

27 ml. silicone-coated glass vials were filled with 5.056 gm. of the blend (16 doses).

8.2 ml. silicone-coated glass vials were filled wtih 0.316 gm. of the blend (1 dose).

Both lots placed on test. Reconstituted samples (1 dose- 1 ml. reconstituted volume) drained rapidly and completely and were not foamy.

EXAMPLE 6

| Ingredient | Amount used gram | Per 1 dose, gram |
|---|---|---|
| Methyl paraben | 1.188 | 0.0009 |
| Propyl paraben | 0.132 | 0.0001 |
| Polyvinylpyrrolidone | 6.60 | 0.0050 |
| Lecithin | 2.640 | 0.0020 |
| Sodium citrate (anhydrous) | 7.920 | 0.0060 |
| Sodium chloride | 2.640 | 0.0020 |
| Ampicillin trihydrate, 200 mesh | 396.0 | 0.3000 |
| Total weight per 1 dose | | 0.316 |
| Total weight/5 doses | | 1.58 |
| Total weight/16 doses | | 5.056 |

The polyvinylpyrrolidone, lecithin and parabens were dissolved in 200 ml. methylene chloride and coated onto the ampicillin trihydrate by trituration in a mortar. The coated ampicillin was dried at 37° C. for 72 hours and screened 200 mesh. The 200 mesh powder was then blended for 30 minutes with the sodium citrate and sodium chloride, packaged and placed on test.

Determination by bioassay (after 100-fold dilution) of the stability of reconstituted samples after storage for the indicated periods of time at room temperature (25° C.) gave the following assay results in mcg./ml.:

| Time in weeks: | Assay in mcg./ml. |
|---|---|
| Initial | 2735 (2800, 2700) |
| 1 | 2815 |
| 2 | 2700 |
| 3 | 2585 |
| 4 | 2600 |
| 6 | 2685 |
| 8 | 2765 |

EXAMPLE 7

| Ingredient | Amount used, gram | Per 1 dose, gram |
|---|---|---|
| Methyl paraben | 1.188 | 0.0009 |
| Propyl paraben | 0.132 | 0.0001 |
| Polyvinylpyrrolidone | 6.600 | 0.0050 |
| Lecithin | 2.640 | 0.0020 |
| Sodium citrate, anhydrous | 7.920 | 0.0060 |
| Sodium chloride | 2.640 | 0.0020 |
| Ampicillin trihydrate, 200 mesh | 396.00 | 0.3000 |
| Total weight per 1 dose | | 0.316 |
| Total weight per 5 doses | | 1.580 |
| Total weight per 16 doses | | 5.056 |

The polyvinylpyrrolidone, lecithin and parabens were dissolved in 220 ml. methylene chloride and coated by trituration onto the ampicillin trihydrate. The coated ampicillin trihydrate was dried at 37° C. for 24 hours, screened 200 mesh and blended with the sodium citrate and sodium chloride.

The blend was packaged, labelled and placed on test.

Determination by bioassay (after 100-fold dilution) of the stability of reconstituted samples after storage for the indicated periods of time at room temperature (25° C.) gave the following assay results in mcg./ml.

| Time in weeks: | Assay in mcg./ml. |
|---|---|
| Initial | 2635 (2650, 2650) |
| 1 | 2750 |
| 2 | 2535 |
| 3 | 2650 |
| 4 | 2585 |
| 6 | 2465 |
| 8 | 2535 |

EXAMPLE 8

| Ingredient | amount used, gm. | Per 1 dose gm. |
|---|---|---|
| Methyl paraben | 0.6300 | 0.0009 |
| Propyl paraben | 0.0700 | 0.0001 |
| Polyvinylpyrrolidone | 3.5000 | 0.0050 |
| Lecithin | 0.7000 | 0.0010 |
| Sodium chloride | 0.3500 | 0.0005 |
| Sodium citrate, anhydrous | 4.2000 | 0.0060 |
| Ampicillin trihydrate, 200 mesh | 420.00 | 0.6000 |
| Total weight per one dose | | 0.6135 |
| Total weight per 16 doses | | 9.8160 |

The parabens, lecithin and polyvinylpyrrolidone were dissolved in 135 ml. methylene chloride and coated onto a mixture of the ampicillin trihydrate, the sodium chloride and the sodium citrate by trituration in a mortar.

The coated powder was dried at 37° C. for 24 hours, screened 200 mesh, blended for 2 hours and packaged.

A 16 dose vial containing 9.8160 gm. was reconstituted with 8.8 ml. of DI. water; the resulting suspension was fluid drained well, filled easily into a syringe, and injected through a No. 22 1½" needle into rabbit muscle.

Determination by bioassay after 100-fold dilution of the stability of reconstituted samples after storage for the indicated periods of time at room temperature (25° C.) gave the following assay results in mcg./ml.

| Time in weeks: | Assay in mcg./ml. |
|---|---|
| Initial | 5360 (5450, 5380) |
| 1 | 5560 |
| 2 | 5600 |
| 3 | 5415 |
| 4 | 6100 |
| 6 | 5120 |

EXAMPLE 9

Ampicillin I.M. product (200 mesh or micropulverized)

(Label claim is 0.250 gm. ampicillin activity/ml.)

FORMULA

| | Per one 1-dose vial (grams) |
|---|---|
| Ampicillin, anhydrous, bulk sterile (200 mesh) | [1] 0.250 |
| Lecithin, R.G. | [2] 0.002 |
| Methyl paraben, U.S.P. sterile | 0.0009 |
| Propyl paraben, U.S. P., sterile | 0.0001 |
| PVP (polyvinylpyrrolidone), sterile | [3] 0.005 |
| Sodium chloride, U.S.P., sterile (processed to 200 mesh) | 0.002 |
| Trisodium citrate, sterile, anhydrous, 200 mesh | [4] 0.006 |

[1] 0.250 gram of activity. (Label claim is 250 mg./ml. ampicillin activity. This weight may be increased in amount by adding increments based on the following factors:
  (1. Potency of ampicillin
  (2. Overbatch required for shelf life (stability)
  (3. Overfill required for vial, syringe and needle holdup
  (4. Machine fill variability.)
[2] Lecithin may be varied, if desired, between 0.002 and 0.004 gram/dose.
[3] PVP may be varied, if desired, between 0.002 and 0.010 gram/dose.
[4] Anhydrous trisodium citrate may be varied, if desired, between 0.003 and 0.010 gram per dose.

Manufacturing instructions (1) The anhydrous ampicillin to be used must be sterile, pyrogen free and handled aseptically throughout the processing.

(2) The anhydrous ampicillin is pulverized through a sterile Fitzmill equipped with a 100 mesh screen, water on the jacket and mill running at 8500 r.p.m., at the rate of 25 kilos/hour and collected into a sterile container.

(3) The pulverized anhydrous ampicillin, the 200-mesh sodium chloride and the anhydrous trisodium citrate are then loaded into a sterile Patterson-Kelly V blender equipped with an intensification bar adapted for liquid addition. The blender has been rendered sterile by spraying with peracetic acid and exposure to ethylene oxide gas for 16 hours prior to use. Care must be taken, before blender is loaded, so that no condensation of the gases has occurred inside the blender. The condensation may be prevented by obtaining proper atmospheric room temperature. The blender is run for thirty minutes with intensification action to assure initial blending of material.

(4) Using the "liquid addition apparatus" of the blender, add the required volume of sterile, pyrogen free PNP-lecithin-methyl and propyl paraben-methylene chloride solution in five equal portions; in preparing this solution use 0.2 ml. methylene chloride per ml. of final product after reconstitution. After each addition of solution the intensification bar is utilized for a maximum of two minutes using. 4 "agitation" periods during the fifteen minute blending period required for each addition of solution. At the termination of each blending period the pressure developed during the blending process must be released (noted on gauge on shell of blender) and vacuum applied to remove the methylene chloride vapors. This must be repeated to assure complete removal of vapors.

(5) When all the solution has been added and blend properly vacated of vapors the material is dropped from the blender and trayed for drying. The material is placed in covered trays and placed in a hot air atmospheric oven and dried for six hours. The temperature of heated air should not exceed 45° C. After six hours of heating, the heat is turned off and dry air is circulated over the trays for 10 hours to assure complete drying.

(6) Repulverized the coated material utilizing the procedure of Step (2) so that the following requirement is met:

Retained on a 200 mesh screen
0.1% maximum (7) Blend the powder from Step 6 for two hours.

(8) Collect into sterile containers as a finished bulk product for final disposition.

(9) The proper amount of coated anhydrous ampicillin mixture is filled using aseptic technique, into officially designated size *silicone* coated vials.

Use

The addition of sterile water q.s. 1 ml. produces an elegant aqueous suspension of ampicillin which is stable at room temperature for at least three months.

EXAMPLE 10

Ampicillin I.M. product (200 mesh or micropulverized (Label claim is 0.400 gm. ampicillin activity/ml.)

FORMULA

| | Per one 1-dose vial (grams) |
|---|---|
| Ampicillin, anhydrous, bulk sterile (200 mesh) | (1) |
| Lecithin, R.G. | [2] 0.001 |
| Methyl paraben, U.S.P., sterile | 0.0009 |
| Propyl paraben, U.S.P., sterile | 0.0001 |
| PVP (polyvinylpyrrolidone), sterile | [3] 0.005 |
| Sodium chloride, U.S.P., sterile (processed to 200 mesh) | [4] 0.001 |
| Trisodium citrate, sterile, anhydrous, 200 mesh | [5] 0.006 |

[1] 0.400 gram of activity. (Label claim is 400 mg./ml. ampicillin activity. This weight may be increased to a maximum of 8% by adding increments based on the following factors:
  (1. Potency of ampicillin
  (2. Overbatch required for shelf life (stability)
  (3. Overfill required for vial, syringe and needle holdup
  (4. Machine fill variability
  (5. If an overfill of greater than 8% is required, then an increased fill and more water for reconstitution is required.)
[2] Lecithin may be varied, if desired, between 0.001 and 0.003 gram/dose.
[3] PVP may be varied, if desired, between 0.001 and 0.010 gram/dose.
[4] Sodium chloride may be varied, if desired between 0.0005 and 0.002 gram/dose.
[5] Anhydrous trisodium citrate may be varied, if desired, between 0.003 and 0.009 gram per dose.

Manufacturing instructions

As in Example 9

Use

The addition of sterile water q.s. 1 ml. produces an elegant aqueous suspension of ampicillin which is stable at room temperature for at least three months.

EXAMPLE 11

Ampicillin I.M. product (200 mesh or micropulverized)

(Label claim is 0.500 gm. ampicillin activity/ml.)

| | Per one 1-dose vial (grams) |
|---|---|
| Ampicillin anhydrous bulk sterile (200 mesh) | (1) |
| Lecithin, R.G. | [2] 0.001 |
| Methyl paraben, U.S.P., sterile | 0.0009 |
| Propyl paraben, U.S.P., sterile | 0.0001 |
| PVP (polyvinylpyrrolidone), sterile | [3] 0.005 |
| Sodium chloride, U.S.P., sterile (processed to 200 mesh) | [4] 0.0005 |
| Trisodium citrate, sterile, anhydrous, 200 mesh | [5] 0.006 |

[1] 0.500 gram of activity. (Label claim is 500 mg./ml. ampicillin activity. This may be increased to a maximum of 8% by adding increments based on the following factors:
  (1. Potency of ampicillin
  (2. Overbatch required for shelf life (stability)
  (3. Overfill required for vial, syringe and needle holdup
  (4. Machine fill variability
  (5. If an overfill of greater than 8% is required, then an increased fill and more water for reconstitution is required.)
[2] Lecithin may be varied, if desired, between 0.0005 and 0.003 gram/dose.
[3] PVP may be varied, if desired, between 0.002 and 0.01 gram/dose.
[4] Sodium chloride may be varied, if desired between 0.0003 and 0.002 gram/dose.
[5] Anhydrous trisodium citrate may be varied, if desired, between 0.003 and 0.012 gram per dose.

Manufacturing instructions

As in Example 9.

Use

The addition of sterile water q.s. 1 ml. produces an elegant aqueous suspension of ampicillin which is stable at room temperature for at least three months.

EXAMPLE 12

| Ingredient | Amount used, gram | Per 1 dose, gram |
|---|---|---|
| Polyvinylpyrrolidone | 1.5 | 5 |
| Lecithin | 0.6 | 2 |
| Methyl paraben | 0.27 | 0.9 |
| Propyl paraben | 0.03 | 0.1 |
| Sodium chloride | 0.6 | 2 |
| Sodium citrate, anhydrous | 1.8 | 6 |
| Ampicillin, anhydrous | 90.0 | 300 |
| Total weight/dose | | 316 |
| Total weight/5 doses | | [1] 1.58 |

[1] Gm.

The polyvinylpyrrolidone, lecithin and parabens are dissolved in 50 ml. methylene chloride and coated onto the anhydrous ampicillin by trituration in a mortar. The coated powder is then air dried at 37° C. for 24 hours, screened 200 mesh, and blended with the 200 mesh sodium chloride and sodium citrate.

15 ml. silicone-coated glass vials are filled with 1.58 gm. of the blend.

When reconstituted with 3.8 ml. DI (deionized) $H_2O$, the volume of the suspension is 5 ml.

The reconstituted suspension injects readily through a No. 22 1½″ needle, does not pack after 48 hours standing and is not foamy after shaking.

EXAMPLE 13

| Ingredient | Amount gram | Per 1 dose, gram |
|---|---|---|
| Methyl paraben | 0.6300 | 0.0009 |
| Propyl paraben | 0.0700 | 0.0001 |
| Polyvinylpyrrolidone | 3.5000 | 0.0050 |
| Lecithin | 0.7000 | 0.0010 |
| Sodium chloride | 0.3500 | 0.0005 |
| Sodium citrate, anhydrous | 4.2000 | 0.0060 |
| Ampicillin, anhydrous, 200 mesh | 420.00 | 0.6000 |
| Total weight per one dose | | 0.6135 |
| Total weight per 16 doses | | 9.8160 |

The parabens, lecithin and polyvinylpyrrolidone are dissolved in 135 ml. methylene chloride and coated onto a mixture of the anhydrous ampicillin, the sodium chloride and the sodium citrate by trituration in a mortar.

The coated powder is dried at 37° C. for 24 hours, screened 200 mesh, blended for 2 hours and packaged.

A 16 dose vial containing 9.8160 gm. is reconstituted with 8.8 ml. of DI. water; the resulting suspension is fluid, drains well, fills easily into a syringe, and can be injected through a No. 22 1½″ needle into rabbit muscle.

Determination by bioassay shows satisfactory stability for reconstituted samples after storage twelve weeks at room temperature (25° C.).

The stability of the reconstituted products increases with their concentration; to achieve the specified stability (i.e. no more than 10% loss in bioactivity) it is necessary to have a concentration of about 125 mgm./ml. or greater. However, even at a concentration as low as 50 mgm./ml. the reconstituted product possesses the great advantage of being stable for more than two weeks at room temperature.

We claim:
1. A composition in unit dosage form which after the addition of sterile water is then stable for at least three months when stored at room temperature and is suitable for intramuscular injection in mammals comprising
    (a) 200 mesh or smaller particles of sterile amphoteric ampicillin of which each gram is coated with from 1 to 16 mgm. of lecithin and with from 2 to 40 mgm. of sterile polyvinylpyrrolidone and
    (b) from 0.6 to 10 mgm. of sterile, 200-mesh. U.S.P. sodium chloride per gram of ampicillin.
2. A composition in unit dosage form which after the addition of sterile water is then stable for at least three months when stored at room temperature and is suitable for intramuscular injection in mammals comprising
    (a) 200 mesh or smaller particles of sterile amphoteric ampicillin of which each gram is coated with from 1 to 16 mgm. of lecithin and with from 2 to 40 mgm. of sterile polyvinylpyrrolidone and
    (b) from 0.6 to 10 mgm. of sterile, 200-mesh, U.S.P. sodium chloride per gram of ampicillin and
    (c) from 6 to 40 mgm. of an additional nontoxic, pharmaceutically acceptable inorganic salt providing sodium ions per gram ampicillin.
3. A composition in unit dosage form which after the addition of sterile water is then stable for at least three months when stored at room temperature and is suitable for intramuscaular injection in mammals comprising
    (a) about 62.5 to 500 mgm. of 200-mesh sterile amphoteric ampicillin of which each gram is coated with about 2 to 8 mgm. of lecithin and with about 10 to 20 mgm. of sterile polyvinylpyrrolidone and
    (b) from 1 to 8 mgm. of sterile, 200-mesh, U.S.P. sodium chloride per gram of ampicillin
    (c) from 12 to 24 mgm. of sterile, anhydrous 200-mesh trisodium citrate per gram of ampicillin.
4. A composition as defined in claim 1 in which the amphoteric ampicillin is ampicillin trihydrate.
5. A composition as defined in claim 3 in which the amphoteric ampicillin is ampicillin trihydrate.
6. A composition as defined in claim 1 in which the amphoteric ampicillin is anhydrous ampicillin.
7. A composition as defined in claim 3 in which the amphoteric ampicillin is anhydrous ampicillin.

References Cited

UNITED STATES PATENTS

| | | | |
|---|---|---|---|
| 2,745,785 | 5/1956 | Bruce et al. | 424—271 |
| 2,897,120 | 7/1959 | Cronin et al. | 424—271 |
| 3,351,527 | 11/1967 | Apat et al. | 424—271 |

ALBERT T. MEYERS, Primary Examiner

D. M. STEPHENS, Assistant Examiner

U.S. Cl.X.R.

424—271, 365